(12) United States Patent
Morse et al.

(10) Patent No.: US 12,026,704 B2
(45) Date of Patent: Jul. 2, 2024

(54) SYSTEM AND METHOD FOR ASSESSING A DIGITAL INTERACTION WITH A DIGITAL THIRD PARTY ACCOUNT SERVICE

(71) Applicant: Plaid Inc., San Francisco, CA (US)

(72) Inventors: Eric Morse, Tiburon, CA (US); Max Johnson, San Francisco, CA (US); Austin Lin Gibbons, Austin, TX (US); Kevin Hu, San Francisco, CA (US); Samir Naik, Charlotte, NC (US)

(73) Assignee: Plaid Inc., San Francisco, CA (US)

( * ) Notice: Subject to any disclaimer, the term of this patent is extended or adjusted under 35 U.S.C. 154(b) by 0 days.

(21) Appl. No.: 17/125,544

(22) Filed: Dec. 17, 2020

(65) Prior Publication Data

US 2021/0182850 A1     Jun. 17, 2021

Related U.S. Application Data

(60) Provisional application No. 62/949,414, filed on Dec. 17, 2019, provisional application No. 62/949,417, filed on Dec. 17, 2019.

(51) Int. Cl.
*G06Q 20/38* (2012.01)
*G06N 20/00* (2019.01)
*G06Q 20/40* (2012.01)

(52) U.S. Cl.
CPC ....... *G06Q 20/38215* (2013.01); *G06N 20/00* (2019.01); *G06Q 20/4014* (2013.01); *G06Q 20/4016* (2013.01)

(58) Field of Classification Search
CPC ......... G06Q 20/38215; G06Q 20/4014; G06Q 20/4016; G06N 20/00
See application file for complete search history.

(56) References Cited

U.S. PATENT DOCUMENTS 7,577,554 B2      8/2009  Lystad et al.
9,231,942 B1 *   1/2016  Pinkerton ........... H04L 63/0884
(Continued)

FOREIGN PATENT DOCUMENTS

WO      2018017767 A1    1/2018

OTHER PUBLICATIONS

Martin Skara, Reconstructing Custom Fragments of google Knowledge Graph on the fly? (Year:2020).
(Continued)

*Primary Examiner* — Jamie R Kucab
(74) *Attorney, Agent, or Firm* — Harrity & Harrity, LLP

(57) ABSTRACT

A system and method for assessing digital interactions with a digital third party accounts can include receiving user account credentials for authentication with an external computing system, storing the user account credentials in association with a authentication token and communicating the authentication token to a computing device of an external application service; receiving, through a programmatic communication interface, a request that references the authentication token and digital interaction details; programmatically authenticating, using the stored user account credentials, as a user account with the external computing system and retrieving account data; processing the account data in combination with the digital interaction details and thereby generating a digital interact assessment; and initiating execution of a digital interaction based in part on the digital interaction assessment.

20 Claims, 11 Drawing Sheets

(56) References Cited

U.S. PATENT DOCUMENTS

| | | | |
|---|---|---|---|
| 9,262,771 B1* | 2/2016 | Patel | G06Q 30/0248 |
| 9,760,645 B1 | 9/2017 | Park | |
| 10,142,307 B1 | 11/2018 | Page | |
| 10,250,612 B1 | 4/2019 | Raposa | |
| 10,452,523 B1* | 10/2019 | Vijayalekshmi | G06F 11/3688 |
| 11,120,158 B2 | 9/2021 | Hockey et al. | |
| 2005/0268107 A1 | 12/2005 | Harris et al. | |
| 2005/0273773 A1 | 12/2005 | Gold et al. | |
| 2008/0195534 A1 | 8/2008 | Landis et al. | |
| 2008/0276242 A1 | 11/2008 | Taniguchi et al. | |
| 2008/0288621 A1 | 11/2008 | Snell et al. | |
| 2009/0254476 A1 | 10/2009 | Sharma et al. | |
| 2012/0030125 A1 | 2/2012 | RamaKrishnanNair | |
| 2012/0150742 A1 | 6/2012 | Poon et al. | |
| 2013/0212234 A1 | 8/2013 | Bartlett et al. | |
| 2014/0081667 A1 | 3/2014 | Joao | |
| 2014/0189808 A1 | 7/2014 | Mahaffey et al. | |
| 2014/0330732 A1 | 11/2014 | Grignon | |
| 2015/0066805 A1 | 3/2015 | Candee et al. | |
| 2015/0088756 A1 | 3/2015 | Makhotin et al. | |
| 2015/0249660 A1 | 9/2015 | Bailey et al. | |
| 2015/0317613 A1 | 11/2015 | Clark | |
| 2015/0350485 A1* | 12/2015 | Kamada | H04N 1/4406 358/1.15 |
| 2016/0028715 A1* | 1/2016 | Sivashanmugam | H04L 63/0861 726/7 |
| 2016/0080381 A1* | 3/2016 | Hall | H04L 63/0884 726/7 |
| 2016/0350747 A1 | 12/2016 | Pruthi et al. | |
| 2017/0041963 A1 | 2/2017 | Edge | |
| 2017/0068954 A1 | 3/2017 | Hockey et al. | |
| 2017/0098294 A1 | 4/2017 | Kim et al. | |
| 2018/0005316 A1 | 1/2018 | Robbin et al. | |
| 2018/0039988 A1 | 2/2018 | Gupta | |
| 2018/0064609 A1 | 3/2018 | Hines | |
| 2018/0067631 A1 | 3/2018 | Thiercelin et al. | |
| 2018/0095997 A1 | 4/2018 | Beveridge et al. | |
| 2018/0181962 A1* | 6/2018 | Barnhardt | G06Q 20/4016 |
| 2018/0295514 A1 | 10/2018 | Brown et al. | |
| 2019/0012647 A1 | 1/2019 | Bouey et al. | |
| 2019/0102574 A1* | 4/2019 | Roberts | G06F 16/221 |
| 2019/0200227 A1 | 6/2019 | Woodward et al. | |
| 2019/0205885 A1 | 7/2019 | Lim et al. | |
| 2019/0207771 A1 | 7/2019 | Hecht et al. | |
| 2019/0278928 A1 | 9/2019 | Rungta et al. | |
| 2019/0318122 A1 | 10/2019 | Hockey et al. | |
| 2019/0370615 A1 | 12/2019 | Murphy et al. | |
| 2020/0134001 A1 | 4/2020 | Kantamsetty et al. | |
| 2020/0211002 A1 | 7/2020 | Steinberg | |
| 2021/0081947 A1 | 3/2021 | Hockey et al. | |
| 2022/0084037 A1* | 3/2022 | Fang | G06Q 20/4016 |

OTHER PUBLICATIONS

International Search Report and Written Opinion for Application No. PCT/US2020/065698, dated Apr. 1, 2021, 8 pages.

Extended European Search Report for Application No. EP20903299.4, dated Oct. 30, 2023, 9 Pages.

* cited by examiner

Receiving an interaction request for an account S10

Accessing the account S20

Retrieving account information and analyzing the account information S30

Providing a resulting assessment or score S40

FIGURE 1

```
┌─────────────────────────────────────────────┐
│ Collecting user account credentials and storing the │
│ user account credentials in association with an     │
│ authentication token S110                           │
└─────────────────────────────────────────────┘

┌─────────────────────────────────────────────┐
│ Receiving a request referencing digital interaction │
│ details S120                                        │
└─────────────────────────────────────────────┘

┌─────────────────────────────────────────────┐
│ Programmatically authenticating, using the stored   │
│ user account credentials, as a user account with the│
│ external computing system and retrieving account    │
│ data S130                                           │
└─────────────────────────────────────────────┘

┌─────────────────────────────────────────────┐
│ Processing the account data in combination with the │
│ digital interaction details and thereby generating a│
│ digital interact assessment S140                    │
└─────────────────────────────────────────────┘

┌─────────────────────────────────────────────┐
│ Initiating execution of a digital interaction based in│
│ part on the digital interaction assessment S150     │
└─────────────────────────────────────────────┘

┌─────────────────────────────────────────────┐
│ Initiating execution of a digital interaction based in│
│ part on the digital interaction assessment S150     │
└─────────────────────────────────────────────┘
```

FIGURE 2

Receiving a request specifying digital interaction details S210

Receiving user account credentials for authentication with an external computing system S220

Programmatically authenticating, using the stored user account credentials, as the user account with the external computing system and retrieving account data S230

Processing the account data in combination with the digital interaction details and thereby generating a digital interact assessment S240

Initiating execution of a digital interaction based in part on the digital interaction assessment S250

FIGURE 3

```
┌─────────────────────────────────────────┐
│ Collecting user account credentials and │
│ storing the user account credentials in │
│ association with an authentication      │
│ token S110                              │
└─────────────────────────────────────────┘

┌─────────────────────────────────────────┐
│ Receiving a request referencing digital │
│ interaction details S120                │
└─────────────────────────────────────────┘

┌─────────────────────────────────────────┐
│ Programmatically authenticating, using  │
│ the stored user account credentials, as │
│ a user account with the external        │
│ computing system and retrieving account │
│ data S130                               │
└─────────────────────────────────────────┘

┌─────────────────────────────────────────┐
│ Processing the account data in          │
│ combination with the digital            │
│ interaction details and thereby         │
│ generating a digital interact           │
│ assessment S140                         │
└─────────────────────────────────────────┘

┌─────────────────────────────────────────┐
│ Initiating execution of a digital       │
│ interaction based in part on the        │
│ digital interaction assessment S150     │
└─────────────────────────────────────────┘

┌─────────────────────────────────────────┐
│ Initiating execution of a digital       │
│ interaction based in part on the        │
│ digital interaction assessment S150     │
└─────────────────────────────────────────┘

┌─────────────────────────────────────────┐
│ Receiving interaction feedback and      │
│ updating machine learning model using   │
│ data results indicated in the feedback  │
│ S160                                    │
└─────────────────────────────────────────┘
```

FIGURE 7

SYSTEM AND METHOD FOR ASSESSING A DIGITAL INTERACTION WITH A DIGITAL THIRD PARTY ACCOUNT SERVICE

CROSS-REFERENCE TO RELATED APPLICATIONS

This Application claims the benefit of U.S. Provisional Application No. 62/949,417, filed 17 Dec. 2019, and U.S. Provisional Application No. 62/949,414, filed on 17 Dec. 2019, both of which are incorporated in their entireties by this reference.

TECHNICAL FIELD

This invention relates generally to the field of processing digital interactions, and more specifically to a new and useful system and method for assessing a digital interaction with a digital third party account.

BACKGROUND

Recent years have seen an expansion in digital tools and services used in providing financial services. This has seen an increase in the use of such tools and the moving away from cash-based transactions. With such changes have come increased demand for financial transaction tools that are faster and more convenient for integration with digital tools such as consumer facing applications. Unfortunately, the underlying mechanisms for facilitating financial transfers or performing other digital interactions operate with little insight into the involved parties or even the context of a given transaction. Such limitations add risk to such transactions. This risk is partly addressed through processes and checks that slowdown the completion of a transaction. Current technical solutions are limited in preventing such delays. Additionally, the use of existing mechanisms and systems may introduce exposure to fraudulent actions or costly accidental errors.

Thus, there is a need in the processing digital interactions field to create a new and useful system and method for assessing a digital interaction with a digital third party account. This invention provides such a new and useful system and method.

BRIEF DESCRIPTION OF THE FIGURES

FIG. 1 is a flowchart representation of a method;

FIG. 2 is a flowchart representation of a method variation;

FIG. 3 is a flowchart representation of a method variation with alternative use of authentication;

FIG. 7 is a flowchart representation of a method variation;

DESCRIPTION OF THE EMBODIMENTS

Figure 4:
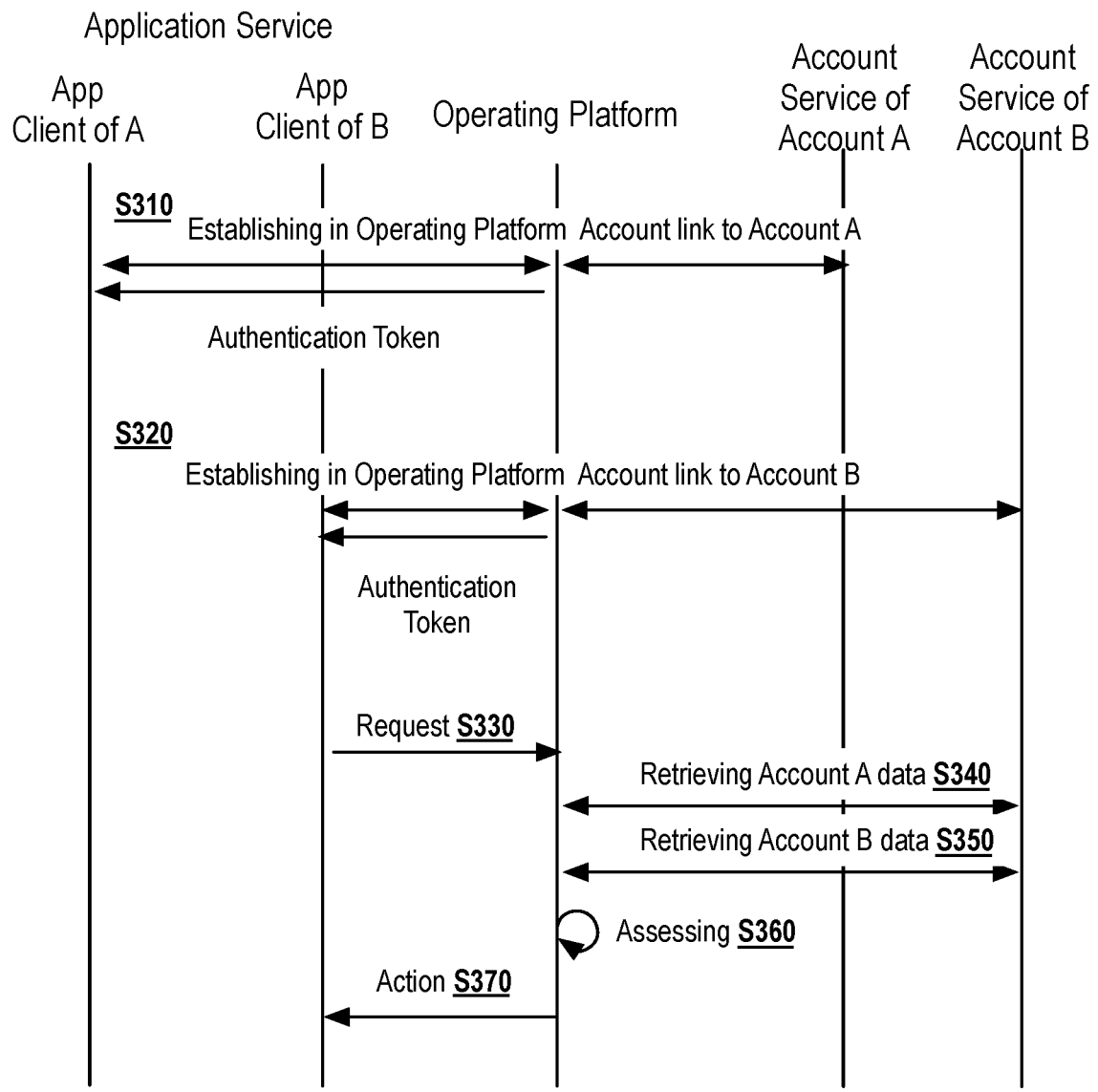
FIG. 4 is a communication flow diagram establishing and using access to multiple user accounts.

The following description of the embodiments of the invention is not intended to limit the invention to these embodiments but rather to enable a person skilled in the art to make and use this invention.

1. Overview

A system and method for assessing fraud risk with digital third party accounts functions to use secured account authentication and inspection for interaction analysis in the control of digital interactions.

The system and method preferably enable unique capabilities of a computing platform to securely and in a privacy-focused manner allow one party to integrate analysis of account data in the context of specific interactions without having direct access to related data. In some implementations, the system and method may be particularly applied to enabling a specially configured computing system to pre-dictively assess or score interaction outcomes for interactions involving at least one external digital user account. As one potential application, the system and method can be used in the evaluation and assessment of potential fraud (or quality) of financial transactions. For example, the system and method can be applied to scoring transaction outcomes (e.g., assessing fraud risk) for a given ACH (automated clearing house) transfer interaction. The system and method can use digital access to digitally managed financial accounts, as enabled through the system and method, to analyze, score, and/or manage ACH and/or other forms of financial transactions. This may be particularly applied to ACH financial transactions, but can similarly be applied to other account actions. The system and method could similarly be applied to any suitable form of digital interaction and, more specifically, other forms of financial transactions such as wire transfers, credit card payments, cryptocurrency transactions or exchanges, foreign currency exchange, and/or other suitable types of digital transactions.

The system and method are generally described herein as implemented between computer systems of three entities: an operating computing platform, an application computing service, and an external digital account service. In general these entities are distinct though the system and method may alternatively be configured for implementation as an internal tool or service. The operating computing platform (alternatively referenced herein as the operating platform) is generally a computer system using the system and/or implementing the method with integration with one or more application services and one or more external account services. The operating platform may, in some implementations, be implemented as a multitenent software-as-a-service computing platform comprised of multiple computing systems used in combination to serve multiple (and typically distinct) developer accounts. The developer accounts will generally be accounts used by application services in interfacing with the operating platform. In the financial transaction application of the system and method, the operating platform serves as an intermediary API service providing financial services to application services and interfacing with financial user account services of various online banks, investment companies, and the like.

The operating platform can be separate and distinct from other external computing systems such as the application service and external account services. Being distinct and external computing systems, herein, is at least partially characterized by lacking direct access to databases and data records and/or being implemented on a computing infrastructure and hardware outside of the direct control of the operating computing platform. However, in some variations, the system and method may be implemented as part of an internal service of a computing system making interaction inquiries and/or hosting user account data. An application computing service (alternatively referenced herein as the application service) is generally an application or webservice that is used by an end user. An application service will generally be operated by an external third party. For example, the application service may facilitate an application instance operable on a computing client of a user that provides some utility to the user. The application service may alternatively not be user-facing and could similarly be a computing service used by other computer systems. There can generally be multiple distinct application services that make use of the operating platform. The external digital account service (alternatively referenced herein as the external account service) are generally third-party operated computing platforms, at which users will have user accounts. In the financial transaction application of the system and method, an external account service could be an online bank, an online financial account, a credit card account page, and/or any suitable online account system for managing one or more financial account. External account services may be traditionally accessed by a user using an application or a website. The system and method can be used for interaction analysis in connection with user accounts of external account services. Data of such external user accounts may be highly sensitive such that direct access by an inquiring party like an application service may not be desired by owners of the external user accounts (e.g., the users). The operating platform (e.g., implementers of the system and method) may, in some implementations, prevent direct access to such data. Furthermore, the system and method may function to enable analysis of digital interactions involving accounts across a variety of external systems. The system and method may additionally work across the variety of external systems despite subsets of the external systems exposing interfaces and levels of access to user account data. The operating platform may use one or more various programmatic interfaces for communicating with and inspecting user data from such external account services. In some cases, such user account data may lack any direct programmatic access to the user account data in which case, the system and method can use virtualized access to the user account data. In some cases, for example, virtualized application instances may be used in accessing user account data of an external account service when an API is not usable.

The system and method are preferably implemented by an operating computing platform with programmatic interfaces to digital platforms of a set of financial institutions. The programmatic interfaces are used in accessing user account data. In some exemplary implementations, the system and method, can be used in connection with third-party financial user accounts such as bank accounts, savings accounts, investing accounts, and/or other types of financial accounts. Third-party financial user accounts can be an account with an external systems such as a bank online account system, investment online account system, savings online account system, or other suitable digital systems of a financial institution.

The programmatic interface can preferably be used in accessing and analyzing various properties of a user account when authorized to do so. Account information such as personal user information (e.g., name, address, email, phone number, contact information, age, and the like), routing and account information, account activity (e.g., transaction records including outgoing and incoming payments) balance information, account status, and/or other suitable information that can be accessed and used by the system and method. An implementing system acting as the operating platform may be one such as the one described in U.S. Pat. No. 9,449,346, issued Sep. 20, 2016, hereby incorporated in its entirety by this reference.

The operating computing system may implement the system and method in connection with a programmatic interface. In one preferred variation, the operating platform implements the system and method in connection with a programmatic interface exposed to inquiring parties such that interaction assessment can be integrated into digital control of interactions of the inquiring parties. In particular, the system and method can be preferably implemented wherein it can enable external entities to receive and/or use generated fraud scores. The fraud scores may be requested and return through a programmatic interface, preferably in the form of an application programming interface (API). The system and method can be implemented so as to provide a transaction assessment as part of a digital tool. More specifically, the transaction assessment can be a fraud risk check, but may alternatively frame the transaction assessment in alternative forms such as a transaction confidence check or a transaction classification.

Such assessments may be presented as: a probability score predicting probability of an outcome, a measure normalized to a standard score (e.g., a measure of risk relative to an average level of risk), a combination of scores or metrics, a label (e.g., classifying as "fraud"), or any suitable form.

A fraud risk check may make use of a fraud risk score that provides a metric related to the amount of risk associated with a transaction being part of fraudulent or undesired outcome. As such the fraud risk score may measure fraud.

A confidence check may make use of a transaction confidence score which serves as an alternative metric to risk that indicates a measure, classification, or other form of assessment related to the positive qualities of a transaction.

A transaction classification may assign a label as opposed to a numerical score. A transaction classification can serve to bucket different classifications into distinct categories or assign various labels/tags to a transaction. As an example a transaction classification can be used in discretely specifying a transactions more likely belonging to one of the following classifications: "high risk from possible fraudulent activity", "high risk of possible refund request", "standard transaction, "high confidence transaction". Such classifications serve as examples, and any suitable set of classifications, labels, or tags may be used. In some variations, a transaction classification may specify one or more classifications with an accompanying confidence score or other suitable metric. The system and method can be implemented as a software-as-a-service solution wherein a number of developer accounts can interface with the operator of the system and method (via an API) to leverage the capabilities of the fraud risk check. The system and method may help a developer assess the potential risks of fraud in one or a series of payment transactions involving a consumer who is an end-user. In particular, the system and method can be used for generating a fraud risk score or evaluation for ACH transfers or other types of bank transfer mechanisms.

The system and method can generally involve collecting user account credentials so as to establish an account link to at least one user account of an external account service, then receive a request or prompt indicating a particular interaction associated with a user account of which an account link is usable, programmatically accessing a user account using the user account credentials and/or the established account link and retrieving user account data, processing the account data an optionally other supplementary data and generating a digital interaction assessment, and then performing some action in response to the assessment. For financial transactions, such a system or method may be used in assessing fraud and/or confidence in a transaction. The system and method may further apply techniques in managing authentication with the external account services to enable the process to be secure and efficient.

The system and method may be adapted and used for various applications. As a limited list of potential applications, the system and method may be used to accelerate financial transactions positively assessed with high confidence, to regulate or prevent transactions negatively assessed, to automate financial transactions, trigger additional transaction authentication or authorization actions for a given transaction in response to an assessment, and/or any other suitable application.

Some variations of the system and method may relate to systems and techniques for securely and efficiently obtaining user account data via instantiation of virtualized or simulated instances of first-party software applications. For example, the system may include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data and thereby financial data from external systems than previous techniques. Further, the user account data may be normalized and requested and/or provided via a normalized API, enabling more efficient inspection and analysis of such data (originally obtained from multiple external systems) from a single standardized interface in a highly efficient manner. In this way normalized and more consistent financial reports can be generated from user accounts from various financial institutions. Some variations may also relate to systems (e.g., a permissions management system) and techniques for enabling a user to securely authorize a third-party system of an inquiring party (e.g., an application service) to securely connect and perform actions in relation to an account, without disclosing to the third-party system the account credentials (e.g., an identity of the account). In some variations, the actions performed may involve initiating or managing transactions. Such transactions may include, for example, initiating an electronic payment, like an ACH transfer or the like. A token (e.g., a unique identifier associated with the electronic record, also referred to herein as a "unique record identifier") may be shared with the third-party system, but in some implementations neither the electronic record itself, nor the user account credentials, may be shared with the third-party. Accordingly, the third-party inquiring party (e.g., a merchant system or a software application developed by a developer) may reference a user account data in relationship to some interaction (e.g., as a recipient or originator of an ACH transaction) by providing the token, but does not itself know, e.g., account number, etc. Furthermore, the system and method of the present disclosure can enable the third party inquiring party to facilitate digital interactions that depend on detailed inspection and analysis of a third-party account without having direct access to such an account or its data. In various embodiments, large amounts of data are automatically and dynamically retrieved and processed in response to application programming interface (API) requests and other user inputs, and the retrieved data is efficiently and compactly accessible to a customer or user also via normalized API responses from the system or in the form of asset/financial reports. The data may be retrieved in an efficient way via instantiation of virtualized/simulated instances of mobile applications, for example. Thus, in some embodiments, the API interfaces described herein are more efficient as compared to previous interfaces in which data is not normalized and compactly and efficiently provided to the customer user in response to such requests. Advantageously, using the system, an inquiring party may perform actions depending, at least in part, on data from multiple disparate data sources (e.g., data stores) and/or systems, each of which may use a proprietary interface, in a standardized way. Further, as described herein, the system and method may be configured and/or designed to generate user interface data useable for rendering one or more of the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist. As one potential benefit, the system and method may enable to new capabilities of a computer system to assess risk and predict potential outcomes for a particular interaction. In particular, the system and method may be used in make digital financial transfers more secure and more reliable by entering into execution of a financial transfer with computer-enabled surveying of data to indicate reliability of such a transfer. As another potential benefit, the system and method may enable assessments of interactions such as financial transactions to enable new forms of execution of such an interaction. In the case of a financial transaction, traditional techniques to transfers such as ACH and wire transfers can have slow processing times as they operate with little to no knowledge of the involved user accounts when performing such transactions. The system and method, through their secure analysis of the actual conditions of involved and related user accounts and supplementary data, may enhance ability to accelerate financial transactions while reducing risk. As another potential benefit, the system and method can employ a technique of delegated authentication such that an operating platform can securely and reliably inspect data without exposing sensitive. This enables improved data security in that highly private and sensitive data can be used by an outside application service without exposing such data to the application service.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and combination and are not necessarily limited to any particular disclosed sequence. Various operations may be described as multiple discrete operations in turn, in a manner that may be helpful in understanding certain embodiments. However, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

2. Method

As shown in FIG. 1, a method for assessing a digital interaction with a digital third party account can include receiving an interaction request for an account S10, accessing the account (which may include authenticating with a financial institution using credentials of the account holder) S20, retrieving account information and analyzing the account information S30, and providing a resulting assessment or score S40.

The method may be particularly applicable to assessing financial interactions involving an account on an external third-party account service. For example, the method can be applied to evaluating fraud or other characterizations of a financial ACH transfer. The method can be used to evaluate the risk of fraud or other complications that could result for a particular requested transaction. In such an implementation for assessing fraud in ACH transfers, the method may more specifically include receiving a transaction request for an account, accessing the account (which may include authenticating with a financial institution using credentials of the account holder), retrieving account information and analyzing the account information, and providing a resulting fraud assessment or score. In some variations, the fraud assessment (e.g., a fraud score) may be delivered to a requesting entity to make an appropriate action. In this way the method may be implemented by an operating platform in providing an interaction assessment API service. In other variations, the fraud assessment may be used to determine processing of the transaction such as permitting or prohibiting a transaction and then initiating or denying the transaction appropriately. The fraud assessment or score may alternatively or additionally be used in altering the financial interaction through processing options such as augmenting transaction execution (e.g., expediting the electronic transfer of funds if the transaction has low risk), changing conditions surrounding the transaction, flagging transaction for review, prompting additional interaction processes (such as additional authentication), and/or other processes. The method preferably involves retrieval of account data for analysis as well as potentially processing of the interaction. As part of retrieving account information, the method can additionally include retrieving account information used for a transaction such as an account number and a routing number etc. As one part of analyzing the account information, the method can include analyzing identity of the account, reviewing funding conditions, and reviewing transaction request. Analyzing identity of the account can assess if there were recent changes to the account (possibly indicating an account take over), if the stored identity information matches identity information presented in the transaction request, the age of the account, the number of other accounts linked to a user account and the conditions of those associated accounts. Reviewing funding conditions can see if sufficient funds are available, predict the balance of the account at the time the payment posts, and reviewing transaction/balance history of the account. Reviewing the transaction request can include analyzing the amount, time of day, and comparison to other transaction requests.

In the general case, the method preferably involves the assessment of an interaction with a digital third party account service and thereby can incorporate a technical approach to altering authentication such that interaction assessments can be more seamlessly integrated into the operation of a computing system. As shown in FIG. 2, a method for assessing a digital interaction with a digital third party account can include collecting user account credentials and storing the user account credentials in association with an authentication token S110; receiving a request referencing digital interaction details S120; programmatically authenticating, using the stored user account credentials, as a user account with the external computing system and retrieving account data S130; processing the account data in combination with the digital interaction details and thereby generating a digital interact assessment S140; and initiating execution of a digital interaction based in part on the digital interaction assessment S150. This method enables an application service to securely have the operating computing platform manage user authentication with the third party account service. In some variations, an application service is provided an authentication token (or another secure identifier) that can be used as a secure indicator of permitted interaction with the user account. The method can be implemented wherein the request is a request for an assessment (i.e., an interaction assessment request). In one variation, the request is made as a transaction assessment request to determine an assessment of the conditions of a financial transfer transaction, such a financial transaction can be a description of a potential future transaction not yet executed, but may alternatively be transaction being executed or previously executed. The method may alternatively be implemented in response to a request with an additional or alternative purpose. For example the request may be a request to perform a particular interaction, in which case, the assessment may be performed as process used to enhance the execution and/or fulfillment of such a request. As shown in FIGURE INSERT, in some variations, authentication of a user account may happen in connection with the request that prompts the assessment of a digital interaction. In one such variation, the collection of user account credentials may be used directly with authenticating with a third party account service and retrieving user account data. The use of authentication tokens and/or storage of authentication tokens may or may not be used in such a variation, and similarly, in some such variations, user account credentials may not be stored. Accordingly, some variations of the method may include receiving, through a programmatic communication interface, a request specifying digital interaction details S210; in connection with the request and through a programmatic interface, receiving user account credentials for authentication with an external computing system S220; programmatically authenticating, using the stored user account credentials, as the user account with the external computing system and retrieving account data S230; processing the account data in combination with the digital interaction details and thereby generating a digital interact assessment S240; and initiating execution of a digital interaction based in part on the digital interaction assessment S250 as shown in FIG. 3. In execution, the user may be guided through a process for supplying user account credentials before or after the request. For example, within an application instance of an application service, the application instance may initiate communication of an interaction assessment request, submitted through an API, to the operating platform. In response to this request, an authentication user interface can be presented in the application instance to facilitate user entry of account credentials that may in turn be used to indicate one of the accounts involved in the interaction. Some variations of the method may involve an interaction involving two or more accessible user accounts in which case the method may involve multiple instances of collecting account credentials and retrieving different user account data. For example, a financial transaction related request may indicate a transaction originating account and a transaction recipient account that are both accessible user accounts within the operating platform. Accordingly, as shown in FIG. 4, a variation of the method involving multiple user accounts may include: receiving first user account credentials (i.e., account credentials of a first user account) for authentication with a first external computing system, storing the first user account credentials in association with a first authentication token and communicating the first authentication token to a computing device of an external application service S310; receiving second user account credentials for authentication with a second external computing system (possibly the same or different from the first external computing system), storing the second user account credentials in association with a second authentication token and communicating the second authentication token to a second computing device of a second external application service (typically the same but possible a different application instance and/or service) S320; receiving, through a programmatic communication interface, a request that references the first authentication token, the second authentication token, and digital interaction details S330; programmatically authenticating, using the stored first user account credentials, as a first user account with the external computing system and retrieving first user account data (i.e., account data of the first user account) S340; programmatically authenticating, using the stored second user account credentials, as a second user account with the external computing system and retrieving second user account data (i.e., account data of the second user account) S350; processing the first account data, the second account data, and the digital interaction details and thereby generating a digital interact assessment S360; and initiating execution of a digital interaction based in part on the digital interaction assessment S370. In some variations, the method may be implemented wherein the assessment (e.g., the fraud score) is generated and used in offering an API accessible service for querying assessments. In such variations, an operating platform may provide an API whereby external application services can request an inspection of a digital interaction (e.g., an ACH transfer) and receive an assessment. In some variations, a virtualized application instance is used in accessing the account service, wherein a native or web-based application of the account service is instantiated and used to facilitate interactions with the account service. This may be selectively done based on the account service of the user account. In some cases, an account service may have a public or private API by which the operating computing platform may use the API for integrating with the account service for that particular account service. The method may be configured for facilitating different actions through specialized configuration of how the digital interaction assessment is integrated into initiating execution of the digital interaction in block S150.

The method may be configured for providing a digital tool for inspecting the predicted assessment of one or more interactions (e.g., wherein an API is provided for delivering interaction assessments).

The method may be configured for augmenting digital interactions such as expediting execution of a transaction for transaction interactions that satisfy a condition based on the interaction assessment. For example, ACH transfers may be executed with expedited processing as a result of high confidence in the validity of the exchange request.

The method may be configured directly into the processing of a financial exchange, in particular financial exchanges made through a computer-based electronic such as ACH exchanges. In some variations, the digital interaction of the method is the financial transfer or exchange executed between two accounts.

Block S110, which includes collecting user account credentials and storing the user account credentials in association with an authentication token, functions to establish user authentication details to enable access to a user account of an external digital service. Collecting user account credentials is preferably performed as part of establishing an account link to an external service. In the financial transaction variation, the user account credentials are account credentials to a financial user account of a digital financial user account service such as to an online banking or investment service. Collecting user account credentials can include, through a programmatic interface, receiving user account credentials for authentication with an external computing system S111, storing the user account credentials in association with an authentication token S112, and communicating the authentication token to a computing device of an application service S113. The account credentials may be stored directly or may alternatively be stored as part of a digital asset or configuration enabling authenticated access (e.g., a preserved authenticated browser/application). Such mechanisms for authenticated access are described herein as an account link. The user account credentials or the configuration for a related account link can be stored in a database. An authentication token may be used as an index or reference by which the appropriate user account credentials and/or account link may be accessed. Collection of the user account credentials can be performed in connection with a particular application or service. An application instance of an application service is described herein as the application context. For example, a software development kit (SDK) or library of the operating platform may be implemented within an application context, and the SDK can be used in rendering a user interface for collection and verification of user account credentials to an external account service. Alternatively, a user may establish an account link to one or more account services through the operating platform and then authorize or otherwise permit use of such account links to various application contexts.

Establishing the account link using user account credentials will preferably involve facilitating completion of an authentication process dictated by the external account service. This may include supplying user credentials to the external account service and optionally completing other authentication processes such as supplying additional information and/or multi-factor authentication steps. Establishing the account link may include collecting user credentials and supplying the user credentials to the account service. In the event that an account service has additional layers of authentication, establishing the account link may additionally include relaying multi-factor authentication challenges and responses between an application and the account service. User credentials and/or other authentication information is preferably securely stored and managed at the operating platform such that the operating platform can preserve an ability to later access the account service without needing a user to resupply credentials. In one preferred variation involving the use of a guided authentication module, establishing the account link to the user account can include: serving an authentication module to an application client of the first application context, collecting account credentials from the authentication module, performing an authentication process with the account service using the user account credentials, and storing the user account credentials as part of a secure data store of the account link in response to successful authentication with the accounts service.

Serving an authentication module to an application client of the first application context functions to relay information to the application client so that an authentication user interface can be rendered on the application client. In one variation, the authentication module may be a native user interface rendered based on custom code of the application client or alternatively rendered through an SDK of the operating platform. In another variation, the authentication module may be an html rendered site, which may be displayed within the application client in an iframe or web-view. In one variation of the html rendered site, the application client pushes the user state to a browser session to view the authentication module, and in general, the user state is returned to the application client after completion of interacting with the authentication module (e.g., after successfully completing authentication, unsuccessfully completing authentication, or canceling authentication). As part of the authentication module, there is preferably a user interface form facilitating collecting account credentials from the authentication module. This may include collecting username and password for a user account on a particular external account service. These user credentials are preferably securely submitted to the operating platform such that the operating platform can use them on the user's behalf to interact with the account service. Performing an authentication process with the account service using the user account credentials, functions to authenticate the user credentials with the account service thereby gaining access to the user account. The user account credentials are preferably stored if authentication is successful with the account service. The user account credentials are preferably stored in a secure data store of the account link. In one implementation, the account link is the data store of user account credentials and any additional information. This may be indexed or mapped to user identifying information and/or an access authentication token or key so that the application can reference the account link for use in later interactions.

Establishing the account link may additionally include configuring access permissions for an account which functions to set the restrictions and capabilities of an application context when attempting to access and/or use an account link. Access permissions may be specified when receiving an account link access request such that the account link access request includes a set of requested access permissions or where the set of requested access permissions are otherwise communicated to the account-linking service. The access permissions are preferably used to set the permitted interactions and usage policy for a given account link.

An authentication token is preferably generated and shared with an application context (e.g., the application instance), or alternatively communicated to a designated computing resource of the application service. The authentication token is preferably an account-specific token and usable only by an associated developer account of the application service.

Depending on the account service, the method may include accessing through a provided programmatic interface (e.g., a bank account API) or by emulating user interface access of the account service.

In one variation, establishing the account link is performed through API access provided by the account service. Depending on the configuration of the account service this may include the account service granting permission to the operating platform to act on behalf of the user. For example, the account service may grant access to a user account according to how a user responds to a notification that the operating platform is requesting access to their user account.

The systems and processes for authentication used in some variations can include generating or instantiating a proxy, virtualized, or simulated instance of a software application of an account service that is configured to interface with external systems of the account service via public or non-public (e.g., proprietary) application programming interfaces (APIs). The virtualized or simulated instances of the software applications may be authenticated with the external systems as if the virtualized/simulated instances are actually first-party software applications executing on a user computing device.

A variation of emulating user interface access can include in one preferred variation authenticating with the account service with a virtualized application instance (i.e., a virtualized instance of an application) as a form of virtualized authentication. In the authentication module variation above, performing the authentication process with the account service can include performing authentication using the virtualized application instance. The collected user account credentials are preferably submitted to the account service through the virtualized application instance and used to authenticate as a user account. The implementation of virtualized authentication used in some variations can include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. The virtualized application instance of the application can be a browser session or an application session operated and controlled by the operating platform that is used to programmatically emulate human access to a web app or native app. Authentication procedures are preferably relayed from the virtualized application instance to a user interface of the application. In this way, the interface of the application is a proxy for the actual user interfaced managed by the operating platform. The mode of access to a financial institution may additionally depend on the available institution interface module. Accordingly, based on the financial institution, an appropriate institution interface module can be selected. Process of virtualized authentication is described in more detail below and can be incorporated into the method for linking to accounts using credential-less authentication in any suitable manner.

Block S120, which includes receiving a request referencing digital interaction details, functions to receive an initiating communication that prompts an assessment of an interaction. The request can provide details of one or more digital interactions. The digital interactions in the financial transaction variations can include properties of a financial transaction. The digital interaction details can include properties of an ACH transfer such as the amount, the recipient, the receiver, the involved devices of the request (e.g., properties or identifiers of an initiating computer client), and/or other properties. Other financial transaction types can include alternative interactions like a wire request, a cryptocurrency transaction or exchange, a foreign currency exchange, a credit card payment, and/or other form of financial interaction. The digital interaction details are preferably provided in connection to at least one user account and more specifically, at least one user account to which user account credentials have been collected and for which an account link is established. In general receiving the request referencing the digital interaction details includes receiving, through a programmatic communication interface, a digital interaction assessment request that references the authentication token and digital interaction details. Reference to the authentication token is preferably used in determining an account link by which access to account data can be obtained. The authentication token and the digital interaction details may be specified explicitly within the request or indirectly referenced. For example, the request may specify a transaction identifier, which is used in retrieving associated financial transaction information.

In one financial transaction variation, the user account associated with the request is the transaction recipient account (i.e., the recipient of the financial transaction). For example, a fraud assessment may be performed based on determination of if the user account receiving the funds of the transaction is an indication of possible fraud. In some cases, the originator of the financial transaction may be a trusted source such as an account of the application service operator. In other cases, the originator of the financial transaction may another entity of which, access to their user account may or may not be available.

In another financial transaction variation, the user account associated with the request is the transaction originator account (i.e., the originator of the financial transaction). For example, a fraud assessment may be performed based on determination of if the user account initiating the transaction is an indication of fraud. In some cases, the recipient of the financial transaction may be a trusted source such as an account of the application service operator. In other cases, the recipient of the financial transaction may another entity of which, access to their user account may or may not be available.

In another financial transaction variation, user accounts for both the originator and the recipient may be associated with the request financial transaction. Accordingly, in one example, a fraud assessment may be performed based on determination of if either user accounts or the combination of user accounts as well as the transaction details signal high probability of fraud. In such a variation, the method further includes establishing an account link for both accounts in block S110 and then retrieving account data for both accounts in S130 such as shown in FIG. 4.

Block S130, which includes programmatically authenticating as the user account with the external computing system using the stored user account credentials and retrieving account data, functions to access a user account on an external service and collect user account data for analysis when assessing the interaction.

Depending on the external account service with which user account credentials are associated and/or the capabilities of the external account service, different approaches may be used such as API-based authentication or virtualized application authentication.

In the case where different supported account services have different interfaces, programmatically authenticating as the user account with the external computing system can include selecting an authentication process associated with the account service associated with the user account credentials and then implementing the authentication process. This may include: for an API authentication process, authenticating through the application programming interface and for a virtualized application authentication process, authenticating through a virtualized application instance using the user account credentials.

As one variation, programmatically authenticating as the user account with the external computing system and retrieving account data is performed through an API of the external service. Accordingly in such variations, programmatically authenticating can include authenticating, using the user account credentials, a user account with the external account service and then retrieving the user account data through one or more API requests to the external account service. For example, after authenticating and gaining access to a user account, the operating platform may make a sequence of API requests to collect data such as user information, account balance, transaction history, and the like.

Figure 5:
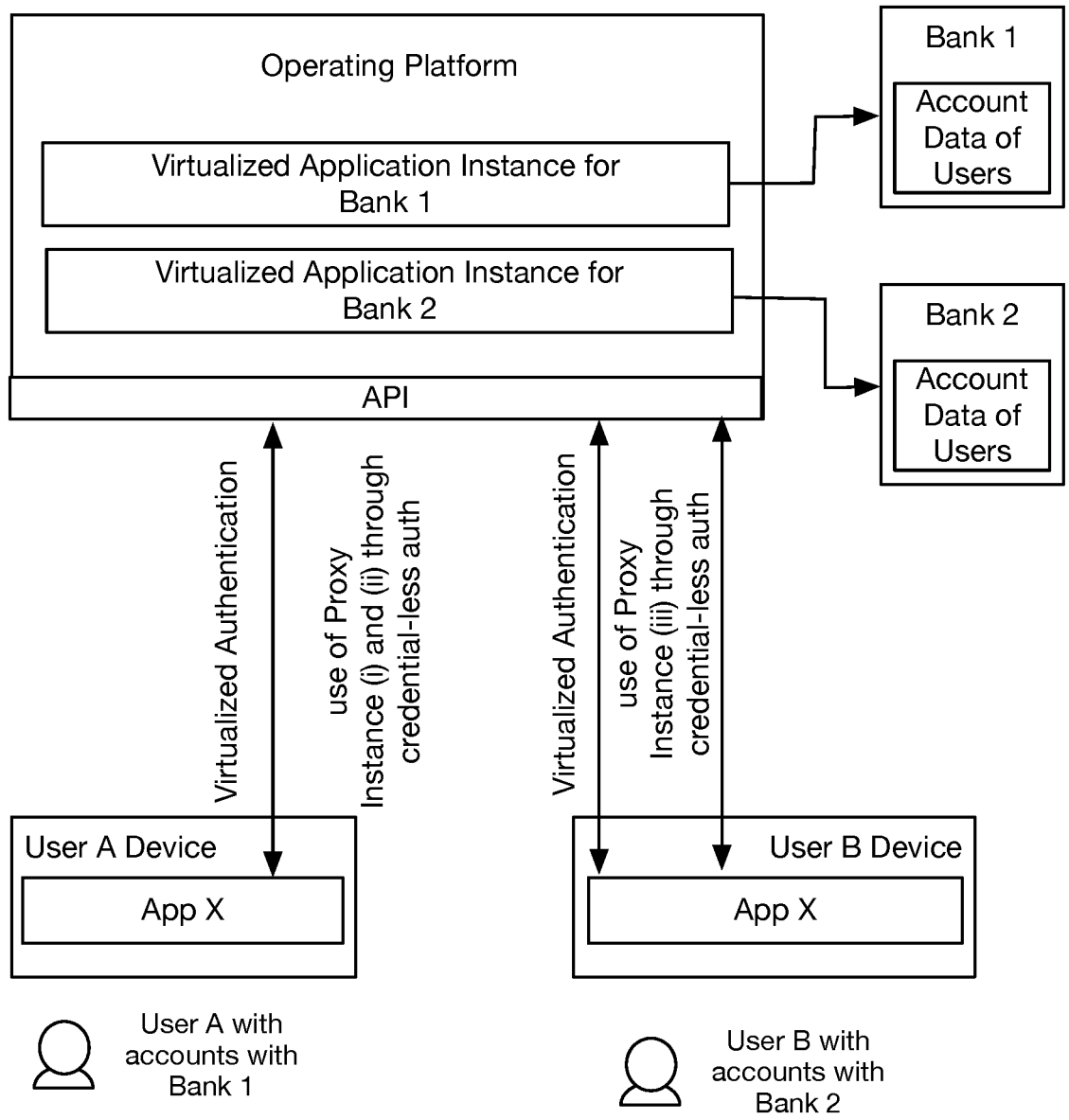
FIG. 5 is a schematic representation of using virtualized application instances.

As another variation, programmatically authenticating as the user account with the external computing system and retrieving account data is performed through a virtualized application instance. Accordingly in such variations, as shown in FIG. 5 programmatically authenticating as the user account with the external computing system can include instantiating a virtualized application instance and programmatically entering the user account credentials into a user interface input of the virtualized application instance; and wherein retrieving account data comprises retrieving account data from through the virtualized application instance.

In some implementations, one or more account services may be directly accessible. The method may, in some variations, be implemented by a computing platform with one such account service. In one example of such an implementation, a bank online computing platform may facilitate the method wherein if the user account is with the bank then direct authentication and/or access may be performed. In the case, that a user account is with a different third-party account service, then selection of an appropriate account service interface or virtualized application instance may be used.

Retrieving account data can be used to retrieve one or more types of user-associated data from the user account. The retrieved account data can be any type of data that may be used as an input or signal used for analysis processing in block S140.

The account data can include user information, account status information, historical records, and/or other data related to a user account. This account data is preferably retrieved from the external account service using a programmatic interface. Additionally or alternatively, there may be internal user data of the operating platform that is stored and maintained as part of the operating platform (e.g., user data and historical records stored within the operating platform). Additionally or alternatively, the account data may further include data retrieved from a related external user account (e.g., a second bank account of the same user as the primary user account).

With respect to the financial transaction variation, retrieving account data can include retrieving user information, account balance, transaction history, and the like from the external user account. User information can include user or entity name, home/mailing address, phone number, email address contact information, bibliographic information (e.g., age), and the like. Transaction history may include a set of recent or all transactions for outgoing and/or incoming. In some instances, transaction records may include transaction amount, involved parties, a description, a timestamp, a location, and/or other suitable information.

In some cases, a user account may have access to multiple linked financial accounts of one user at the external account service. For example, a user account at an online bank may have a checking account, savings account, and/or credit card accounts. Account data may be retrieved from all or a subset of such linked financial accounts.

In addition to collecting data related to a user account from multiple sources (e.g., the external account service, user data of the account service, a related second user account of the same or different account service), retrieving account data may additionally include initially processing the account data and generating calculated or derived data (e.g., metrics or initial assessments/classifications). Such derived data may add as additional or alternative inputs into the processing of block S140. Examples, of calculated account data may include derived account age, characterization of activity as a function of time, income estimates, balance timelines, classification or analysis of portions of the account data, or other generated metrics based.

The method may further include processing to normalize or standardize the account data such that it may be consistently used as an input to processing of block S140. Accordingly, block S130 may include normalizing the account data, which functions to clean the account data and update it to a consistent format. Normalizing the account data can address inconsistencies across different account services. For example, normalizing financial account data can include cleaning transaction and/or merchant names, mapping the original transaction record information to standard identifiers.

Figure 6:
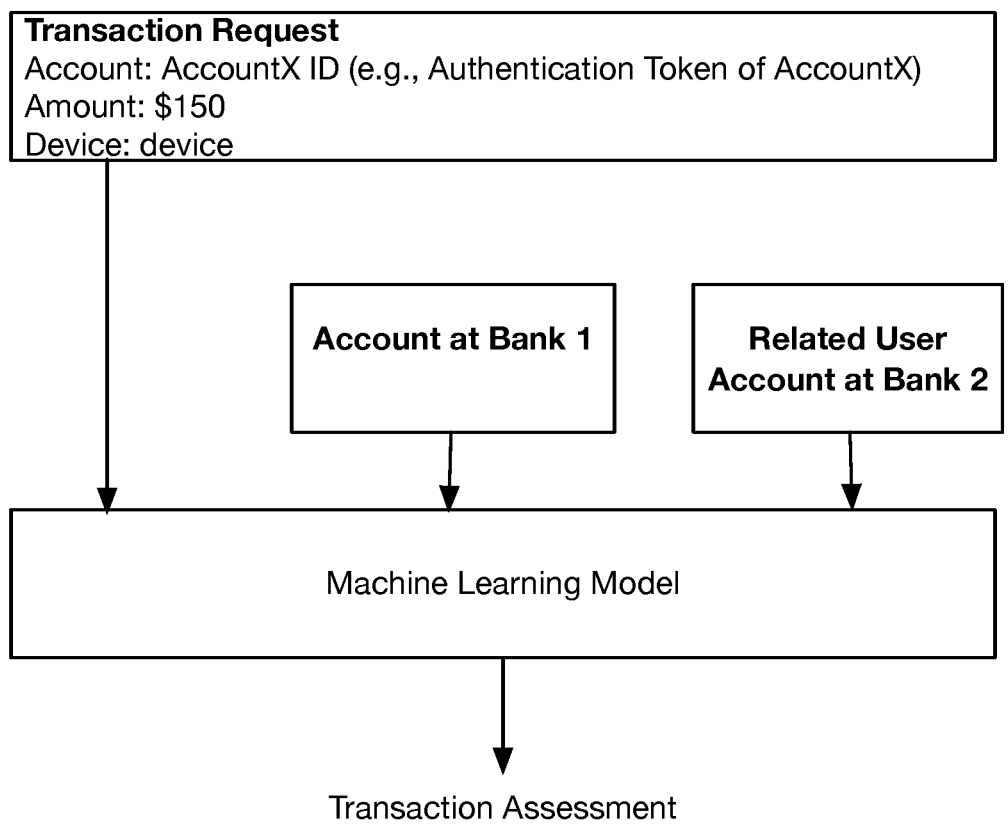
FIG. 6 is a schematic representation of exemplary inputs to a machine learning model.

In some instances there may be multiple user accounts that are associated with one entity. The operating platform may have established account links for two or more different external user accounts. Such related external user accounts may not be directly involved in the interaction. The operating platform can previously establish an association of related external user accounts for one person or entity. For example, the operating platform may have collected user account credentials with two different financial accounts of the same user. The related external user accounts may or may not be known or communicated to an inquiring application service, and as such the related external user accounts may transparently enhance the interaction analysis beyond what the application service may have visibility into. In some instances, user information from related user accounts may additionally be retrieved and considered when processing the account data to generate a digital interaction assessment as shown in FIG. 6. This may be used to further the data signals that when analyzed could indicate that a user account is in good standing with expected usage. This may similarly be used in expanding the analyzed signals such that various irregular and/or problematic activity could be better identified. For example, recent changes for one or more related user accounts, mismatch of user information between user accounts, suspicious transaction history across related user accounts, and/or other patterns may be patterns that can be detected when such user account data is collected and used as input to analysis processing.

Block S140, which includes processing the account data in combination with the digital interaction details and thereby generating a digital interact assessment, functions to analyze the account data to determine an assessment. The digital interaction assessment can characterize a prediction of one or more predictions for the interaction. The one or more prediction can be related to the probability of one or more predicted outcome. In the case of a financial transaction interaction, the prediction may relate to the likelihood (or not) of the transaction being successful; resulting in a return from user error; being rejected by an originating, facilitating, or destination bank; and/or being flagged or labeled as fraud; and/or other potential outcomes. The operating platform can preferably calculate the transaction interaction assessment for the transaction by comparing transaction information against other transactions (e.g., historical transactions and/or transactions previously assessed), bank transfer services, and/or other suitable services of the operating platform that provide relevant information. The comparison may be based on: information received from the bank account (e.g. identity, balance, transaction history); information that the operating platform has about the customer at that time (e.g. credentials appear on credential compromise list, Consumer has linked to a number of customers in a short period of time); information about the transaction itself (merchant category, amount, time of day, etc.); information the application service has provided; and/or other trends/signals from within the operating platform or its extended network.

Herein, the present description makes reference to the example of the assessment being positioned as a fraud risk score, but such a score may generally characterize positive outcomes, negative outcomes, and/or a combination of types of outcomes.

In the variation where the digital interaction assessment is a fraud risk score, the score could characterize an assessment of potential issues with the interaction. For example, the assessment may indicate a degree or probability of an interaction resulting in some negative result (e.g., a request for a return of funds or cancelation).

Conversely, the score could be inversely characterized as an assessment of confidence or likelihood of a positive outcome from the interaction. For example, the assessment may indicate a degree or probability of an interaction being completed with no issues (e.g., user error, processing error, and/or relating to potential fraudulent activity).

Processing of the data can include processing of any or all of the account data. In the case of a financial transaction variation, this may include processing account data such as the user information, account balance, transaction history, related account data (e.g., other accessible user accounts associated with the same user as the primary user account), other participant user account data (from multiple accounts involved in the transaction), data from the operating platform, and/or other data inputs. Processing of such data may use portions of the data in different ways or collective process all data together such as using the various data as feature inputs into a machine learning model.

As one variation of processing user information, user information confirmation may be used to ensure that the user information extracted from a user account of an external account service corresponds to user information associated with the description of the interaction. Accordingly, retrieving account data in block S130 can comprise retrieving user information; and processing the account data of block S140 can include comparing the user information and the request-associated user information. The digital interaction details in this variation can be specified request-associated user information. For example, the details on a financial account to be assessed may specify the legal name and phone number of the recipient or originator bank account. This can be compared with what is stored at the bank account. The resulting comparison, which may be formed as a metric measuring the degree or probability of a match, may be used as a signal into the analysis. This comparison of information may further be extended to comparing interaction details to other account information. This comparison can be used in comparing names, contact information, biographical information, and/or other data of the user to see if there is a strong correspondence. A low degree of match (e.g., high degree of mismatch) can signal possible issues in the interaction. In some variations, the comparison result may be used in conditionally setting an assessment (e.g., setting classification as an error or an invalid transaction because of mismatch of information). In other variations, the comparison may be used as a feature input into a machine learning model.

As one variation of using a machine learning model, processing the account data can include using the account data (at least in part) as feature input into a machine learning classifier model. The machine learning classifier can be a machine learning model or sequence of models that are trained to facilitate classification of an interaction based on a set of feature data input. In the financial transaction variation, for example, processing the account data using a machine learning classifier model may include supplying as feature input: transaction amount, account balance, and transaction records. Such data may be supplied in original format but may alternatively include additional or alternative characterization. For example, the number of transactions, the frequency of transaction amount, the average transaction amount, the minimum transaction amount, the maximum transaction amount, and/or any calculated metric using the transaction history could additionally or alternatively be used as feature input.

The digital interaction assessment can be represented in a variety of formats. In the case of a transaction assessment, the assessment could be framed as a fraud risk assessment. The transaction assessment may alternatively be framed as a transaction confidence check or a transaction classification.

A generated assessment may be formed as: a probability score predicting probability of an outcome, a measure normalized to a standard score (e.g., a measure of risk relative to an average level of risk), a combination of scores or metrics, a label (e.g., classifying as "fraud"), or any suitable form.

A fraud risk assessment may make use of a fraud risk score that provides a metric related to the amount of risk associated with a transaction being part of fraudulent or undesired outcome. As such the fraud risk score may measure fraud.

A confidence assessment may make use of a transaction confidence score which serves as an alternative metric to risk that indicates a measure, classification, or other form of assessment related to the positive qualities of a transaction.

A transaction classification may assign a label as opposed to a numerical score. A transaction classification can serve to bucket different classifications into distinct categories or assign various labels/tags to a transaction. As an example a transaction classification can be used in discretely specifying a transactions more likely belonging to one of the following classifications: "high risk from possible fraudulent activity", "high risk of possible refund request", "standard transaction, "high confidence transaction". Such classifications serve as examples, and any suitable set of classifications, labels, or tags may be used. In some variations, a transaction classification may specify one or more classifications with an accompanying confidence score or other suitable metric.

In the case of an ACH transaction (and similarly applicable to other financial transaction), the categories of interest for a transaction can include bank identified or initiated returns and consumer identified or initiated returns. Bank identified returns relates to the risk that the bank or another financial entity involved in the execution of the transaction initiates a return for a transaction suspected of fraud or unauthorized activity because the account is already overdrawn or because an ineligible account is used. Returns in this category may arrive up to 3 banking days after the origination is transmitted to the network operator. For ACH transactions these may be associated with return codes R01, R02, R03, and/or R44. Consumer identified returns relate to the risk of the customer notifying the bank that they did not authorize the transaction. These may be legitimate returns or part of malicious activity. Returns in this category may, for example, arrive up to 60 calendar days after the origination is transmitted to the network operator. For ACH transactions these may be associated with return codes R07 or R10 for example. In one variation, generation of a digital interaction assessment may be configured to provide scores for each of three families of transaction return scenarios: one score related to Funding (e.g. R01—insufficient funds), one score related to Unauthorized (e.g. R10—Customer Advises Not Authorized; Item Is Ineligible, Notice Not Provided, Signatures Not Genuine, or Item Altered (adjustment entries)), and one score related to Account Issue (e.g. R02—Account closed). The funding score can be a measure of the risk that the transaction will be returned due to insufficient funds. The unauthorized score can be a measure of the risk that the transaction will be reversed by the user due to fraudulent activity. The account issue score can be a measure of the risk that the transaction will be rejected by the RDFI due to an issue with the account. In one variation, the combination of scores indicates a suspicion of fraud for a given return. Although other alternative forms of a score may alternatively be used. As a similar alternative form of the score, a bank-initiated return risk score can be calculated, and a user-initiated return risk score can be calculated. These can be combined in a unified score indicating risk of a return scenario. Alternatively, the assessment may specify the risk of each category. Each score could apply specifically to a payment transaction conducted via an automated clearing house (ACH), such as an ACH debit entry for effecting a payment by the consumer via the consumer's checking account. The fraud score assessment of the method may help outside entities (e.g., developer accounts) measure fraud risks when conducting ACH payments transactions because ACH operators (e.g., the Federal Reserve banks) generally do not enable an originator of an ACH entry to use a built-in tool to assess whether the payor is who the payor claims to be, has provided the correct payment information, or is otherwise initiating a legitimate transaction. The method could be provided as an API service to enable various systems and devices to assess legitimacy of a requested transaction before completing an ACH transaction. Preferably, the assessment would reflect the percentage of transactions with similar attributes that resulted in a return, i.e., a rejection or other instruction to re-initiate the ACH payment. In one variation, for each risk category, the method could surface the contribution of each signal to the overall score for that category. Some exemplary signals could include: a balance signal, profile signal, and a transaction signal. The balance signal may indicate state of a user's balance and spending history. This may be characterized or scored in relationship to the specific transaction. The profile signal may indicate state of a user's profile, like whether their identity/location matches or has changed recently. The transaction signal may indicate state of the transaction itself, like the amount vs recent spending, and whether the transaction is potentially a duplicate of another interaction.

Processing the account data may involve one or more processes used in transforming various inputs (including the account data and other inputs). The processes may be heuristical, statistical, using various machine learning processing, and/or using other suitable processes. In the case of transaction fraud assessment, the fraud assessment may use various algorithms, and heuristics. The fraud assessment may additionally include training and applying a machine learning or deep learning model to interpret a variety of signals such as historical and real-time data. Furthermore, a combination of processes may be used such that processing the account data includes performing multiple stages of processing. For example, account data may be initially processed through various heuristical and/or statistical processes and the output of those processes can be additional inputs to a machine learning model.

As one example, processing account data through a heuristical process can include comparing user information of the account data to user information of the request. This can be used in generating a user information confirmation score or evaluation. This can function in the financial transaction variation, for example to compare user information supplied in the request (e.g., the information conveyed by the application service) to the related bank information. This can be performed for the recipient and/or originator depending which user accounts are accessible.

As another example, processing account data through a heuristical process can include calculating or determining an age of the user account. Similarly, processing the account data can include calculating or determining the duration of usage of an account link. As yet another alternative variation, processing the account data can include calculating or determining the activity level of usage of an account link. Activity may be an overall metric, a time-ordered metric, or any suitable characterization.

As another example, processing account data through a heuristical process can include identifying other application instances and/or related user accounts are related to the user account. For example, multiple different application services may have users within their application service establish links to the same user account of the same external account service. (e.g., the same bank account). This can signal the user having used all applications. Similarly, the user may, through the present application service or a related application service, establish account links to additional distinct user accounts on the same or different account services. In some instances, new use of an application and/or a user account may be associated with more risk (e.g., a user creating gaining control over someone's account and creating a link to perform some fraudulent action) than compared to a user has linked multiple user accounts to multiple applications (e.g., potentially signaling a legitimate user with normal usage).

In some variations a machine learning model, such as deep learning or neural network models, may be employed. As one example, gradient boosting can be employed to produce a prediction model. A machine learning model could be trained for individual application services. For example, one application using the service may supply data that is used in training or updating training of a machine learning model. The supplied data may indicate patterns in interactions and interaction results (e.g., success, flagged as fraud, resulted in error, returned by user, etc.). Training on application service supplied data can customize the model to the users and usage scenarios of a particular application service.

In the case above, a machine learning classifier model may be trained and used in classifying bank identified returns and a second machine learning classifier trained and used in classifying user identified returns.

Additionally or alternatively, a general machine learning model may be used. The generalized learning model may be generalized such that assessment of interactions from multiple application services may use the generalized machine learning model.

Block S150, which includes initiating execution of a digital interaction based in part on the digital interaction assessment, functions to use the digital interaction assessment in performing some action within a computing system related to the digital interaction. The execution (or lack of execution) may depend on and be conditional at least in some manner on the digital interaction assessment. Initiating execution of the digital interaction based in part on the digital interaction assessment may include different variations. Some exemplary variations can include: permitting execution of the interaction/initiating execution of the digital interaction based on the digital interaction assessment; prohibiting or preventing the digital interaction based on the digital interaction assessment; and augmenting execution of the digital interaction based on the digital interaction assessment. Such variations may be specifically applied to the management of financial transactions. As one variation, permitting execution of the interaction/initiating execution of the digital interaction based on the digital interaction assessment includes permitting execution of a financial transaction based on the digital interaction assessment. As discussed above, the digital interaction assessment may be a fraud risk score but may be framed in a variety of ways. The assessment can be used in this variation to determine if the risks associated with the resulting interaction assessment satisfy an acceptance condition (e.g., assessment metric is within an acceptable range) and if the assessment satisfies the acceptance condition, the financial transaction may be initiated or otherwise permitted. In some cases, other signals may be factored into the condition. For example, the transaction amount as indicated in the request and/or geographic location of one or more involved parties may alter assessment. Conversely, prohibiting or preventing the digital interaction based on the digital interaction assessment can include prohibiting or preventing a financial transaction based on the digital interaction assessment. The assessment can be used in this variation to determine if the risks associated with the resulting interaction assessment satisfy a rejection condition (e.g., assessment metric is outside an acceptable range) and if the assessment satisfies the rejection condition, the financial transaction may be initiated or otherwise permitted. In some cases, other signals may be factored into the condition. For example, the transaction amount as indicated in the request and/or geographic location of one or more involved parties may alter assessment. In certain situations, actions may be performed more widely by preventing related interactions or altering status of an account. For example, detection of potentially fraudulent transaction can be used to prevent/cancel, halt, or delay other currently pending transactions; reverse recent transactions; freeze, block, flag, or cancel a user account (within the application context and/or the operating platform); and/or perform any suitable action.

Permitting or prohibiting interactions are preferably performed in combination where failing a condition results can result in corresponding permission or denial of the financial transaction.

As another variation, augmenting execution of the digital interaction based on the digital interaction assessment can include augmenting execution of a financial transaction based on the digital interaction assessment. Augmentation of the financial transaction can be used in various ways. In some situations, augmenting a financial transaction can be used to enhance or accelerate the execution of the transaction for transactions predicted to be high quality. Alternatively, augmenting the financial transaction can be used to mitigate risk associated with potentially problematic transaction.

For positive/low risk financial transactions, augmenting a financial transaction may include skipping verification processing or other processing stages involved in executing the transaction. As one particular example, augmenting the financial transaction can include accelerating execution of the financial transaction. In this way augmenting the financial transaction can removed delayed/staged processing of the financial transaction. For example, waiting periods used implementing a transaction can be canceled or reduced thereby speeding of the performance of the digital financial transaction. For example, an ACH financial transaction may be accelerated so it happens in hours as opposed to multiple days.

For negative/high risk financial transactions, augmenting a financial transaction may include directing execution of the digital interaction for additional or supplementary processing. This may be used for prompting for additional or increased authentication or authorization, routing transaction to a review system, and/or performing any suitable action.

In a variation with additional authentication/authorization, directing execution of the digital interaction for supplementary processing may include increasing authentication requirements and performing such supplemental authentication verification as a conditional process for executing the financial transaction. Accordingly, this may involve initializing or triggering supplemental verification tasks for the user account based on the assessment. The verification task may prompt additional authentication steps to verify identify of the user associated with the user account. The verification task may additionally or alternatively prompt additional authorization steps to confirm permission to perform the transaction (e.g., getting confirmation by another entity). In one example, an automated communication (e.g., phone call or text message) may be communicated to a communication device of the user requesting confirmation of user approval that is communicated through some digital channel. If the transaction is fraudulent or contains an error, the user may respond accordingly, thereby avoiding such a problematic transaction.

In a variation altering review of the transaction, the supplemental processing may include communicating the information of the transaction request through a transaction management system for human or automated approval prior to permitting the transaction.

In some variations, the method may be implemented as part of an API service of the operating platform. In this way, there may be no direct initiation of execution of the digital interaction in block S150. Alternatively, the method may include performing an action related to the digital interaction assessment. Performing such an action may include communicating the digital interaction assessment in response to the request. This can be performed as part of an API response to an API request that initiated the assessment. The API response preferably includes the data/information characterizing the digital interaction assessment. The API response is preferably communicated to the application service. In a variation where the API request originates from an application context, the response can be communicated to the application context. However, in other implementations, the response may be communicated to a callback URL (universal resource locator) or any suitable device of the application service configured for receipt of such a response.

As another variation, the method can be configured to be used in combination with the execution of the digital interaction. The assessment therefor may be directly applied in controlling and managing the interaction. As applied to financial transaction, the method may therefore be used in specially configuring a computing system for processing and executing a digital financial transaction. In one implementation, the request initiating the assessment evaluation may be made through a request to initiate a financial request. For example, an ACH bank transfer request communicated through a programmatic interface to the operating platform may be used to internally initiate assessment of the transaction and then executing the transaction in accordance with the assessment. Furthermore, the retrieval of account may further be used to automatically retrieve and use account details used in executing the transaction. For example, the account and routing numbers of an account may be retrieved for a digital ACH transfer. Alternatively, wire information or any other account specific transaction parameters may be retrieved in block S130 for use in performing the transaction. In a variation of the method that is configured for integration into the transfer request, the request can be a transaction initiation request that indicates a transaction recipient account and a transaction originator account; and additionally, initiating execution of a digital interaction based in part on the digital interaction assessment can include directly facilitating execution of the transaction. Executing the transaction may include permitting or prohibiting initiation of a transaction from the transaction originator account to the transaction recipient account based on the digital interaction assessment. The method may similarly include altering or augmenting the transaction as specified in the variations above. At least one of the accounts involved in the transaction will be associated with an accessible user account (e.g., an account from which account data can be retrieved. The user account associated with block S110 and S130 could be the transaction recipient account or the transaction originator account. In other scenarios, the transaction recipient account or transaction originator account may both be accounts at their respective external account services (e.g., banks or financial account systems) that are accessible by the operating platform. As such, account data of the recipient and originator may be factored into the assessment and used executing the transaction.

In some variations, the method may include receiving interaction feedback and updating machine learning model using data results indicated in the feedback S160. The interaction feedback can be provided by an application service on results of an interaction. In particular, the interaction feedback may indication of any encountered issue or problem. The interaction feedback may additionally or alternatively be used in noting interactions that were successful. In the financial transaction variation, block S160 can include receiving transaction feedback and updating machine learning model using data results indicated in the feedback as shown in FIG. 7. The transaction feedback can be used to label financial transaction results. Exemplary feedback may indicate for a particular financial transaction: confirmation of successful completion, canceled (e.g., prior to execution), bank-issued errors, user return request, association with fraudulent (or potentially fraudulent) activity. In this way a historical record on the status of interactions can be made. The status of a transaction can additionally be updated. For example, an ACH transaction may initially be reported as successful, but if the transaction is later reversed then updated transaction feedback may be received. In some instances the transaction feedback for each or most transactions may be supplied. However, in some implementations, the result of any interaction conveyed to the operating platform may have a default status unless otherwise updated. For example, in one implementation, the status for a transaction that was queried may default to being assumed as successful. The interaction feedback can be communicated to the operating platform through a programmatic interface such as a feedback API. Collected transaction feedback is preferably used in updating the data modeling involved in block S140. In particular, the transaction feedback can be used as training data used to update a machine learning model.

Figure 8:
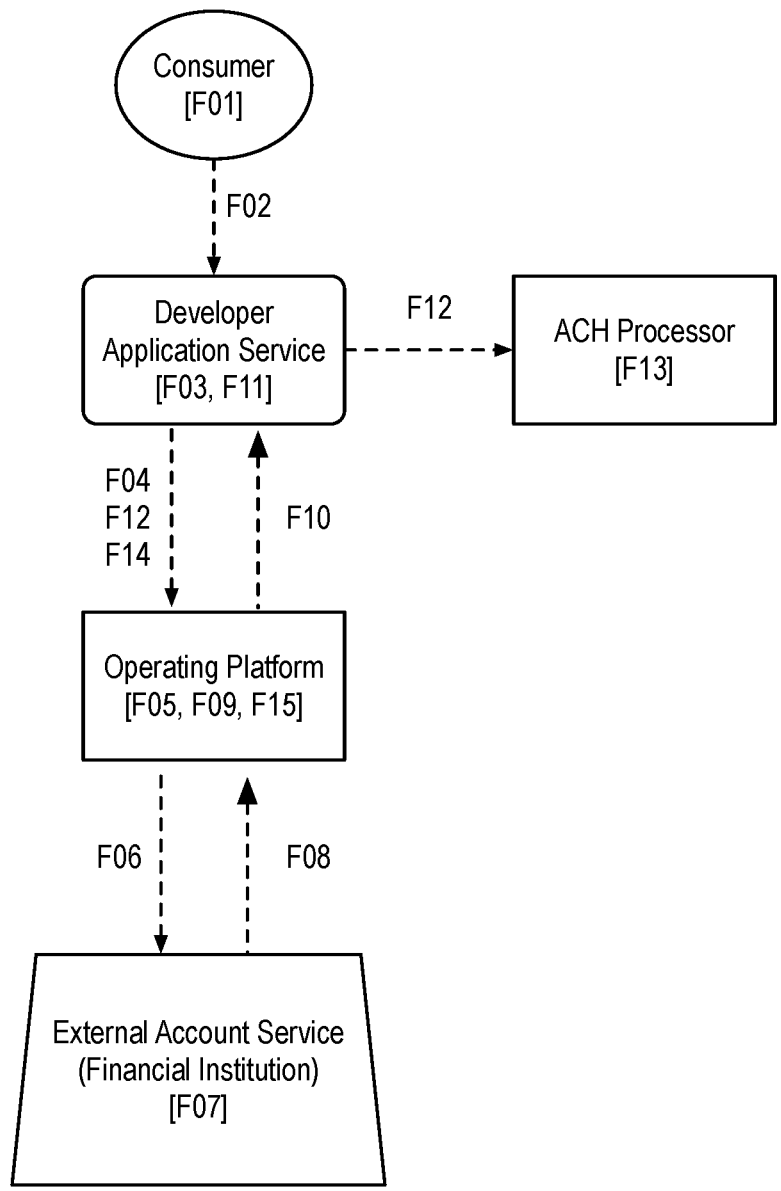
FIG. 8 is a schematic representation of an exemplary implementation performing fraud scoring of a transaction interaction.
Figure 9:
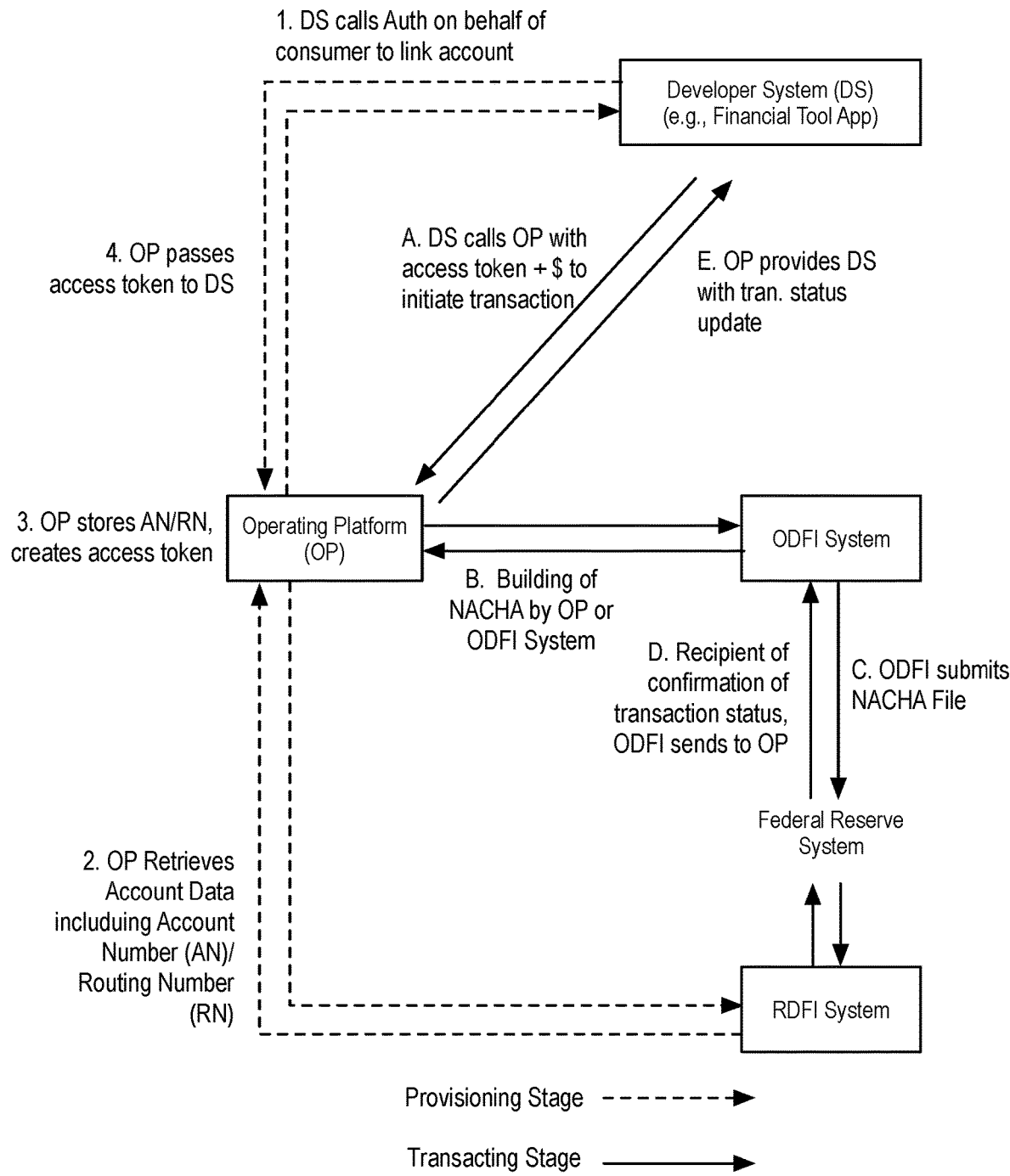
FIG. 9 is a schematic representation of an exemplary implementation performing fraud scoring of a transaction interaction and executing the transaction.

As shown in FIG. 8, the method can be used so that financial transaction requests initiated by a consumer and submitted through a developer system can benefit from a fraud assessment. The method stages F01-F15 are described below.

Stage F01 Consumer: The Consumer is generally a customer or user of the Developer system (e.g., a financial tool application). The Consumer will generally already have been a customer of the Developer for a product/service different from Fraud Risk, and thus already have linked his/her accounts to the operating platform such that the operating platform can access linked financial accounts using stored credentials of the consumer. Alternatively, a consumer may need to link at least one financial account through an authentication process of the operating platform.

Stage F02 Developer Authorization: The Consumer asks to initiate a transaction either for the purpose of moving money between accounts (e.g., from one bank account to another bank account of the consumer) or to purchase a good or service.

Stage F03 Developer: The Developer system is the third party entity interfacing with the operating platform. The Developer generally has the direct contractual relationship with the Consumer and may provide the user interface presented to the consumer. The Developer either offers the Consumer a way to store funds, move funds between accounts, or sells particular goods/services. The Developer system preferably interfaces with the operating platform via an API or any suitable programmatic interface.

Stage F04 API Call: Via an API of the operating platform, the Developer sends to the operating platform a communication (e.g., API request) containing at least a subset of the information:
  a. access token (Developer exchanges previous public token);
  b. account ID;
  c. transaction ID (customer generated);
  d. transaction amount;
  e. select Consumer provided information (e.g. phone number, name, etc.); and/or
  f. select device information (e.g. IP address).

Stage F05 Consent: Consumer will already have consented to various terms, but consent may additionally or alternatively be retrieved. This may be retrieved through a user interface interaction confirming consent.

Stage F06 Platform Login: The operating platform uses the Consumer credentials to access the Consumer's account at the Financial Institution at the point of transaction or utilizes pre-fetched data about the consumer.

Stage F07 Financial Institution: Source of customer DDA account for the transaction. The Bank also stores and can provide information such as transaction history, balance, and identity information.

Stage F08 The operating platform pulls required information from bank account including:
  a. Identity information (first, last, phone, etc.).
  b. Activity on the account (age of account, changes to consumer information, etc.).
  c. Plaid may also pull balance/transaction information at time of ACH request.

In one variation, the operating account may pull additional transaction information from an existing database of the operating platform (independent of the Financial Institution).

Stage F09 Fraud Risk Score. The operating platform can preferably calculate fraud risk score(s) for the transaction comparing this transaction against transactions from other customers using fraud risk assessment services, bank transfer services, and/or other suitable services of the operating platform that provide relevant information. The comparison is preferably based on: information received from the bank account (e.g. identity, balance, transaction history); information that the operating platform has about the customer at that time (e.g. credentials appear on credential compromise list, Consumer has linked to a number of customers in a short period of time); information about the transaction itself (merchant category, amount, time of day, etc.); information the Developer has provided; other trends/signals from the broader Plaid network.

Stage F10 API Call: The operating platform provides the scores back to the Developer. This can be communicated through an API call in response to an API request, transmitted to a callback URI, or communicated in any suitable manner.

Stage F11 Analysis: In one variation, based on Developer's own information regarding the Consumer's transaction and Plaid's fraud risk scores, Developer can determine whether fraud indicators are high enough to restrict the transaction. The Developer can ask the Consumer for more information (e.g. step up authentication) or ask the Consumer to use another account for funding or even contact their bank.

Stage F12: Developer may then initiate or decline to move forward with transaction with their ACH processor. If initiated, Developer informs the operating platform simultaneously with its initiation.

Stage F13 ACH Processor: Developer's processor, which facilitates the ACH transaction with the Developer's ODFI. Debits or credits the Consumer's Financial Institution in Stage F07, depending on the nature of the transaction.

Stage F14 After the fact, Developer provides the operating platform with the status of the transaction and transaction ID (pending, posted, returned). If it's returned, Developer provides the decline reason code. Stage F15 The operating platform takes Developer's information from Stage F14 and further fine-tunes/updates the model used to score transactions. In alternative implementations, the operating platform may directly facilitate the initiation or execution of a transaction. Furthermore, in some variations, the operating platform may decide based on the fraud score if and when to permit a transaction.

Figure 10:
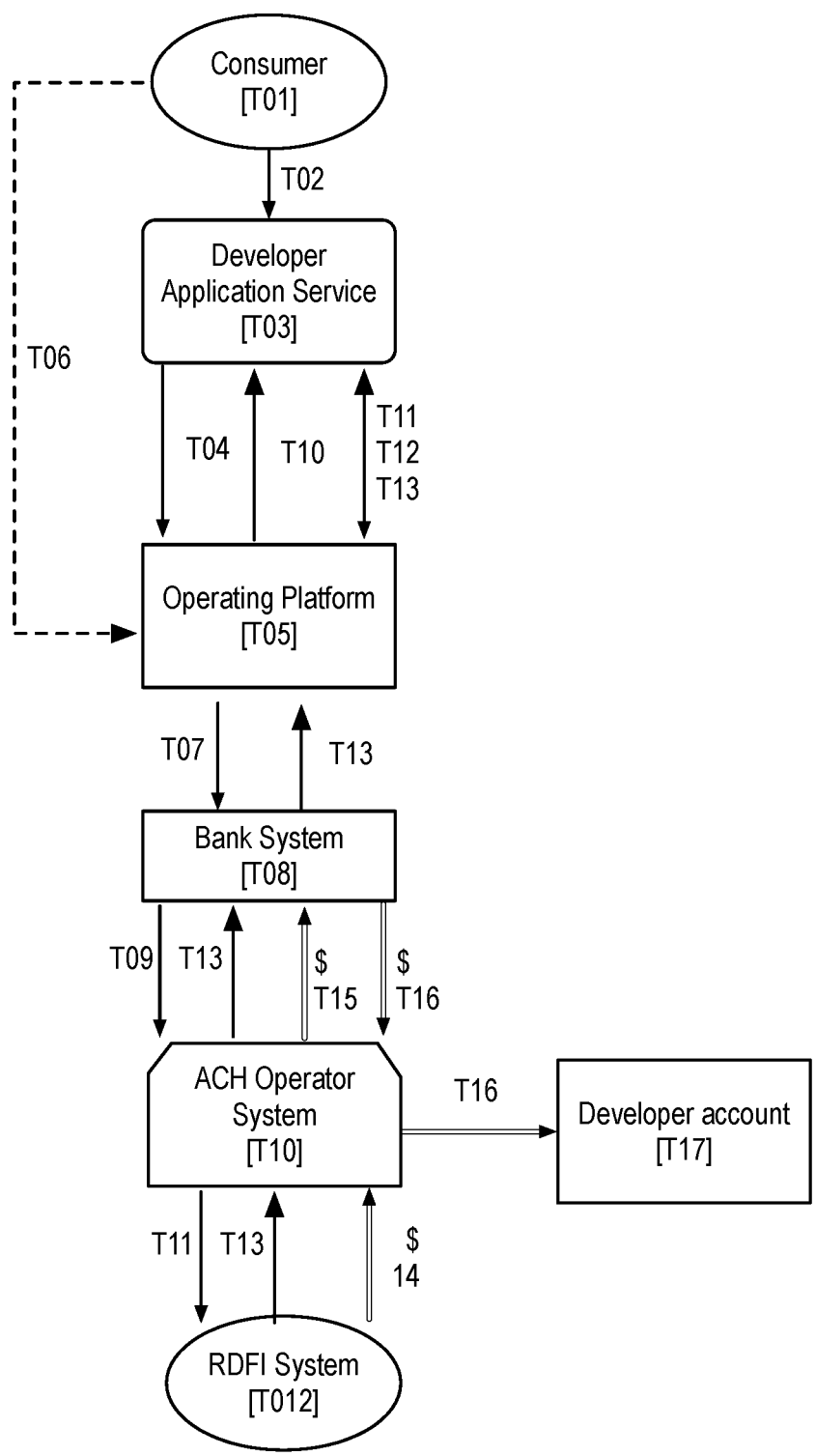
FIG. 10 is a schematic representation of executing a transaction.

As shown in FIGURE INSERT 9, the method can be integrated into a programmatic process used to facilitate a developer system (e.g., some financial app or service) to be granted tokens that can then be used to initiate financial transfer transactions. Below, an exemplary detailed sample of such processing operations is described as it applies to ACH transfers, but such processes may be adapted or configured for other forms of transactions, wherein execution of the transaction and the involved parties can be customized for the type of transaction. Various architectures may be used by the operating platform in facilitating an ACH transfer. As shown in FIG. 10, the method can be used so that financial transaction requests initiated by a consumer and submitted through a developer system can benefit from a fraud assessment. The method stages F01-F17 are described below. Stage T01 Consumer: The Consumer is generally a customer or user of the Developer system (e.g., a financial tool application). The consumer authorizes the transfer of funds from/to his or her bank account.

Stage T02 Authorization: A transfer request or authorization from the consumer to debit/credit from/to the consumer's bank account is received by the Developer system. In the majority of cases, the authorization will typically be made online through a website or application of the application service (e.g., an application service. The consumer can also authorize one transaction or a series of future transactions, such as ongoing payment of fees to the Developer or ongoing payment of installments in an installment sale.

Stage T03 Developer: The developer system can interface with the operating platform as the operating platform's customer (e.g., through a developer account). The developer may have the direct relationship with the consumer, where the operating platform is transparent or less directly observable by the consumer. The Developer will generally be considered the Originator under NACHA Rules, specifically a non-consumer Originator.

Stage T04 Developer Input. Developer inputs information into the operating platform Bank Transfers API (line items reflect Bank System's API per NACHA operating requirements) which may include fields such as fields a-j below:
 a. Amount=amount of transaction.
 b. Description=description up to 8 characters for the end-user's statement.
 c. Same-Day Flag=yes/no (same day or 3-day)(coded by use case).
 d. Standard Entry Class Code—Developer inputs. Bank System supports CCD (Corporate Credit or DebitEntry), PPD (Prearranged Payment and Debit Entry), WEB Internet-Initiated/Mobile Entry).
 e. To Account=account number at Receiving Bank (previously obtained through operating platform Link).
 f. To Account Type=checking or savings (previously obtained through operating platform Link).
 g. To Name=Consumer's full name.
 h. To Routing=Consumer bank's routing number (previously obtained through operating platform Link).
 i. Transaction Type=credit ("push") or debit ("pull"), depending on use case.
 j. Certain Fields that are Standard Entry Class-specific (only relevant to use for WEB). For WEB, payment type=can use single or recurring.

Stage T05 operating platform: The Developer presents the Consumer with a "drop-in-module" of the operating platform. This drop-in module may be used to provide notification that the Developer "uses operating platform to link" the Consumer's account, and collect consent (e.g., "by selecting continue" the Consumer "agrees" to the operating platform Privacy Policy).

Stage T06 Operating Platform Authorization: Authorization may be provided via operating platform's drop-in-module, Consumer both authenticates his/her account at the Financial Institution and provides login credentials to operating platform in order to access it. The authorization may include an institution search pane and a credential entry pane (e.g., user interface modules specially configured to collect user input such as user account credentials. In the institution search pane, the Consumer selects the Financial Institution they are trying to link. In the credential entry pane, the Consumer provides credentials for access to the Consumer's account at the Financial Institution.

Stage T07 Operating platform Input: The operating platform provides the API to facilitate the bank transfer. The operating platform may be subject to compliance obligations under the Master Program Services Agreement with a cooperating Bank System, including due diligence on, and oversight over, Developers. The operating platform also is responsible for funding the Developer-initiated transaction, in the event that the Developer is unable to fund the transaction. The operating platform inputs into the Bank System API the information from Stage T04 along with additional points. Such as inputs a-f below:
 a. From Data=Blank, unless "From Name" below is insufficient for the number of characters.
 b. From Identification=Bank System-generated account number as Company ID Use (for Bank System to know which Developer is the Originator) (may not make itself onto ACH Entry).
 c. From Name=operating platform inserts Company Name (16 characters any characters beyond that go into From Data.
 d. From Routing=From Bank System→hard-coded routing number of Bank System.
 e. To Identification=N/A. We always leave empty.
 f. Transaction ID=operating platform generates 32 character/digits—we create a new one for each transaction. (Bank System, e.g., knows to de-duplicate). Stage T08 Bank System: Originating Depository Financial Institution ("ODFI"). Per NACHA rules, the ODFI is required to have an agreement with corporate Originators, including authorization and other representations and warranties given to the ODFI. For operating platform Bank Transfers, this is embodied by the ACH Authorization Agreement, a triparty agreement among Bank System, operating platform, and the Developer. As the ODFI, Bank System provides reps and warranties to the ACH Operator and the Receiving Banks to support the NACHA ecosystem.

Stage T09 Transmission of "Entry": Bank System, as the ODFI, Transmits the full NACHA Entry. In addition to the data entered into the Bank System API from the operating platform API, Bank System will provide the information in the required NACHA format and add NACHA Record Format fields, such as the File Header Record. Stage T10 ACH Operator: The ACH Operator is an entity that acts as a central facility for the clearing, delivery, and settlement of Entries between participating banks. The Federal Reserve and the Electronic Payments Network are the two ACH Operators. Stage T11 ACH Entry to Receiving Depository Financial Institution: The ACH Operator sends the Entry to the consumer's bank, the Receiving Depository Financial Institution (RDFI). Stage T12 RDFI: The RDFI accepts/posts the Entry and credits or debits the consumer's bank account and provides information to the Receiver (here, the consumer) regarding date, dollar amount, etc. This includes information and rights under Reg E. A consumer has a right for 60 days to notify the RDFI that a transaction was unauthorized. Stage T13 Status Signals including Returns: The RDFI will send back signals regarding the transfer, including Administrative Returns such as Insufficient Funds (R01), Account Closed (R02), No Account/Unable to Locate (R03), and Invalid Account Number (R05). The RDFI will also provide a notice of an Unauthorized Debit Entry (R05, R07, R10, R51), which may be returned when upon the consumer exercising his or her right to identify a transaction as unauthorized. Stage T14 Funds Flow to ACH Operator: Assuming no return codes, funds either push (credit) from the RDFI to the ACH Operator, or the Operator pulls (debits) from the RDFI. Stage T15 Funds Flow to Bank System: Funds flow to a separate account for each Developer's ACH Transfers at Bank System, which may be registered: "Partner Bank FBO [Developer's] Customers." In the case of a payout use case, the funds move from the Developer through the Bank System FBO account to the "Developer Account". Stage T16 Funds Flow to Developer: Second ACH Transfer of funds. Because this is a second ACH Transfer, a full file is required to be assembled for an ACH Transfer (e.g. repeat the process from Stage Tog through Stage T15).

Stage T17 Developer Account: Depending on the use case, the funds go either to (a) to the Developer's operating account at its bank (as a bulk transfer of its underlying funds), or (b) individual consumer accounts at the Developer (if the Developer is a receiving financial institution), the Developer's partner bank (or other ACH-receiving financial institution(s), such as Developer's financial institution customers).

3. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

Similarly, in another variation, a non-transitory computer-readable medium storing instructions that, when executed by one or more computer processors of a computing platform, cause the computing platform to perform operations of the system or method described herein such as: receiving an interaction request for an account, accessing the account (which may include authenticating with a financial institution using credentials of the account holder), retrieving account information and analyzing the account information, and providing a resulting assessment or score.

Figure 11:
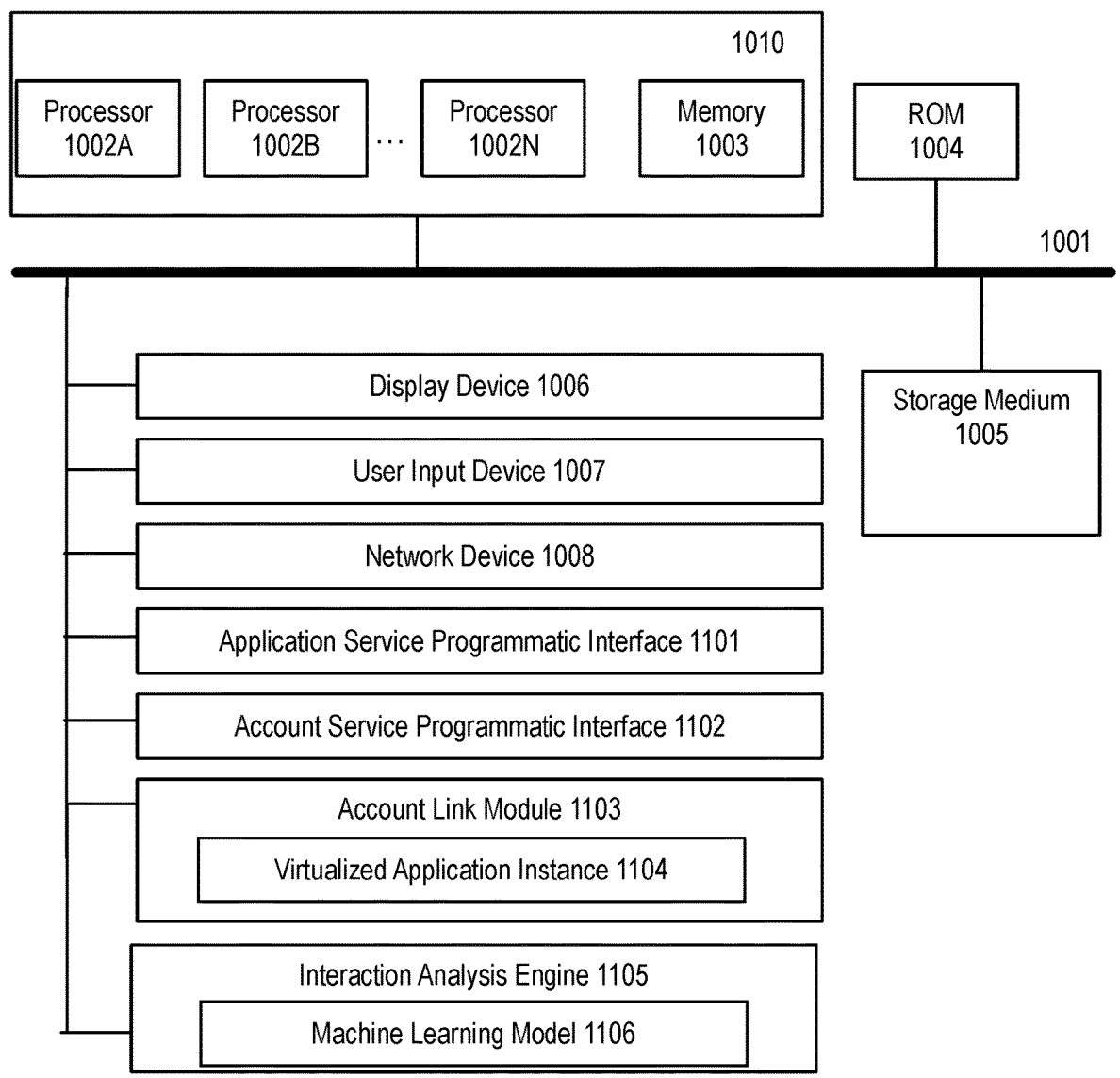
FIG. 11 is an exemplary system architecture that may be used in implementing the system and/or method.

FIG. 11 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting a programmatic interface to one or more application services 1101, programmatic interface to one or more account service interfaces 1102, account link module for managing account credentials and/or authenticated access to account services 1103, which may include virtualized application instances used in accessing account data 1104, interaction analysis engine 1105, which may include a machine learning classification model or other processing models 1106, and/or other suitable computing devices.

The processors 1002A-1002N may take many forms, such CPUs (Central Processing Units), GPUs (Graphical Processing Units), ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-100N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method for securing digital transactions comprising:
    at a processor of an operating computing platform, receiving user account credentials for authentication with an external computing system, storing the user account credentials in association with an authentication token and communicating the authentication token to a computing device of an external application service;
    receiving, through a programmatic communication interface of the computing platform, a transaction initiation request that references the authentication token and digital transaction details, the digital transaction details comprising identification of a transaction recipient account and a transaction originator account;
    instantiating a virtualized application instance emulating user interface access with the external computing system;
    through the virtualized application instance, programmatically authenticating, using the stored user account credentials, a user account with the external computing system,
    wherein programmatically authenticating comprises at least programmatically entering the user account credentials into a user interface input of the virtualized application instance;
    retrieving account data through the virtualized application instance;
    identifying related one or more other user accounts that are associated with the user account;
    retrieving additional account data from the related one or more other user accounts;
    processing the account data and the additional account data in combination with the digital transaction details, using at least the account data as feature input into a machine learning classifier model, and generating a digital transaction assessment;
    augmenting, based on the digital transaction assessment, execution of a digital transaction, wherein the augmenting comprises at least one of:
        determining whether or not to skip a first process involved in executing the digital transaction, or
        configuring a second process that is an additional process involved in executing the digital transaction; and
    permitting or prohibiting, based on the augmenting, a digital transaction from the transaction originator account to the transaction recipient account.

2. The method of claim 1, further comprising receiving interaction feedback and updating the machine learning classifier model using data results indicated in the interaction feedback.

3. The method of claim 1, wherein the digital transaction details reference transaction information; and wherein retrieving account data comprises retrieving user information, account balance, and transaction history.

4. The method of claim 1, wherein retrieving account data comprises retrieving user information,
    wherein the digital transaction details specify request-associated user information, and
    wherein processing the account data comprises comparing the user information and the request-associated user information.

5. The method of claim 1, further comprising:
    initiating execution of the digital transaction based in part on the digital transaction assessment,
        wherein the initiating comprises transmitting a response to the request.

6. The method of claim 1, further comprising:
    initiating execution of the digital transaction based in part on the digital transaction assessment,
        wherein the initiating comprises triggering supplemental verification tasks for the user account based on the digital transaction assessment.

7. The method of claim 1, wherein the user account is the transaction recipient account.

8. The method of claim 1, wherein the user account is the transaction originator account.

9. The method of claim 1, further comprising:
    receiving second user account credentials for authentication with a second external computing system, storing the second user account credentials in association with a second authentication token and communicating the second authentication token to a second computing device of a second external application service,
        wherein the request references the authentication token for indicating a transaction originator and additionally references the second authentication token as a transaction recipient;

instantiating a second virtualized application instance emulating user interface access with the second external computing system;

through the second virtualized application instance, programmatically authenticating, using the stored second user account credentials, as a second user account with the second external computing system; and retrieving second user account data through the second virtualized application instance, wherein processing the account data in combination with the digital transaction details is further processed in combination with the second user account data.

10. A non-transitory computer-readable medium storing instructions that, when executed by one or more computer processors of a computing platform, cause the computing platform to perform operations comprising:

receiving user account credentials for authentication with an external computing system, storing the user account credentials in association with an authentication token and communicating the authentication token to a computing device of an external application service;

receiving, through a programmatic communication interface of the computing platform, a transaction initiation request that references the authentication token and digital transaction details, the digital transaction details comprising identification of a transaction recipient account and a transaction originator account;

instantiating a virtualized application instance emulating user interface access with the external computing system;

through the virtualized application instance, programmatically authenticating, using the stored user account credentials, as a user account with the external computing system, wherein programmatically authenticating comprises programmatically entering the user account credentials into a user interface input of the virtualized application instance;

retrieving account data through the virtualized application instance;

identifying related one or more other user accounts that are associated with the user account;

retrieving additional account data from the related one or more other user accounts;

processing the account data and the additional account data in combination with the digital transaction details, using at least the account data as feature input into a machine learning classifier model, and generating a digital transaction assessment;

augmenting, based on the digital transaction assessment, execution of a digital transaction, wherein the augmenting comprises at least one of:

determining whether or not to skip a first process involved in executing the digital transaction, or configuring a second process that is an additional process involved in executing the digital transaction; and initiating execution of a digital transaction based in part on the augmenting, wherein the execution comprises permitting or prohibiting initiation of the digital transaction from the transaction originator account to the transaction recipient account based on the digital transaction assessment.

11. The non-transitory computer-readable medium of claim 10, wherein retrieving account data comprises retrieving user information, wherein the digital transaction details specified request-associated user information, and wherein processing the account data comprises comparing the user information and the request-associated user information.

12. A system for securing digital transactions comprising:

one or more computer-readable mediums storing instructions that, when executed by one or more computer processors, cause a computing platform to perform operations comprising:

receiving user account credentials for authentication with an external computing system, storing the user account credentials in association with an authentication token and communicating the authentication token to a computing device of an external application service;

receiving, through a programmatic communication interface of the computing platform, a transaction initiation request that references the authentication token and digital transaction details, the digital transaction details comprising identification of a transaction recipient account and a transaction originator account;

instantiating a virtualized application instance emulating user interface access with the external computing system;

through the virtualized application instance, programmatically authenticating, using the stored user account credentials, as a user account with the external computing system, wherein programmatically authenticating comprises at least programmatically entering the user account credentials into a user interface input of the virtualized application instance;

retrieving account data through the virtualized application instance;

identifying related one or more other user accounts that are associated with the user account;

retrieving additional account data from the related one or more other user accounts;

processing the account data and the additional account data in combination with the digital transaction details, using at least the account data as feature input into a machine learning classifier model, and generating a digital transaction assessment;

augmenting, based on the digital transaction assessment, execution of a digital transaction, wherein the augmenting comprises at least one of:

determining whether or not to skip a first process involved in executing the digital transaction, or configuring a second process that is an additional process involved in executing the digital transaction; and initiating execution of a digital transaction based in part on the augmenting, wherein the execution comprises: permitting or prohibiting initiation of the digital transaction from the transaction originator account to the transaction recipient account based on the digital transaction assessment.

13. The method of claim 1, wherein processing the account data and the additional account data in combination with the digital transaction details comprises determining a pattern associated with the user account and the related one or more other user accounts.

14. The system of claim 12, wherein the operations further comprises receiving interaction feedback and updating machine learning model using data results indicated in the interaction feedback.

15. The system of claim 12, wherein the digital transaction details reference transaction information; and
   wherein retrieving account data comprises retrieving user information, account balance, and transaction history.

16. The system of claim 12, wherein retrieving account data comprises retrieving user information,
   wherein the digital transaction details specified request-associated user information, and
   wherein processing the account data comprises comparing the user information and the request-associated user information.

17. The system of claim 12, wherein initiating execution of the digital transaction based in part on the digital transaction assessment comprises transmitting a response to the request.

18. The system of claim 12, wherein initiating execution of the digital transaction based in part on the digital transaction assessment comprises prohibiting the digital transaction based on the digital transaction assessment.

19. The system of claim 12, wherein the user account is the transaction originator account.

20. The system of claim 12, wherein the user account is the transaction recipient account.

* * * * *